United States Patent [19]
Umezawa et al.

[11] Patent Number: 5,521,741
[45] Date of Patent: May 28, 1996

[54] POLARIZATION PLANE SWITCH AND OPTICAL SWITCHING DEVICE USING THE SAME

[75] Inventors: Hiromitsu Umezawa, Toyohashi; Yoichi Suzuki, Hamamatsu; Tomokazu Imura, Kosai; Tsugio Tokumasu, Shizuoka-ken; Hiroshi Rikukawa, Hamamatsu, all of Japan

[73] Assignee: FDK Corporation, Tokyo, Japan

[21] Appl. No.: 427,184

[22] Filed: Apr. 21, 1995

[30] Foreign Application Priority Data

May 9, 1994 [JP] Japan .................................... 6-119633
May 12, 1994 [JP] Japan .................................... 6-123143

[51] Int. Cl.$^6$ ...................................................... G02F 1/03
[52] U.S. Cl. ........................ 359/246; 359/281; 359/283; 359/284
[58] Field of Search ................................... 359/281, 283, 359/284, 246

[56] References Cited

U.S. PATENT DOCUMENTS

| | | | |
|---|---|---|---|
| 4,609,257 | 9/1986 | Shirasaki | 350/376 |
| 4,810,065 | 3/1989 | Valette et al. | 350/355 |
| 4,812,767 | 3/1989 | Taketomi | 324/244 |
| 5,050,968 | 9/1991 | Ohara | 359/281 |

FOREIGN PATENT DOCUMENTS 6-34894  2/1994  Japan .

OTHER PUBLICATIONS

M. Pardavi–Horvath et al. "Asymmetric Switching in high Cercivity Garnet Films", Journal of Magnetism and Magnetic Materials, 104–107. (1992), pp. 433–435.

*Primary Examiner*—Mark Hellner
*Attorney, Agent, or Firm*—Keck, Mahin & Cate

[57] ABSTRACT

A polarization plane switch comprising a Faraday rotator made of an iron-containing garnet single-crystal film and magnetic field applying devices capable of reversing a magnetic field to be applied to the Faraday rotator. The polarization plane switch has a structure in which magnetization of part of the Faraday rotator is unsaturated and that of the remaining portion of it is saturated when a magnetic field is applied to the Faraday rotator by the magnetic field applying device, and a light beam passes through the magnetically saturated portion almost vertically to the film surface. As the above Faraday rotator, it is the most preferable to use a Faraday rotator made of Bi-substituted iron garnet single crystal formed by liquid-phase epitaxy and having a compensation temperature, and thermally treated under the top condition at a temperature between 1,120° and 1,180° C. for 7 hours or less.

8 Claims, 8 Drawing Sheets

POLARIZATION PLANE SWITCH AND OPTICAL SWITCHING DEVICE USING THE SAME

BACKGROUND OF THE INVENTION

1. Field of the Invention

The present invention relates to an optical instrument using a Faraday rotator made of Bi-substituted iron garnet single-crystal film formed by LPE (liquid phase epitaxial technique) and having a compensation temperature in order to increase the switching speed of an optical switching device by substantially eliminating hysteresis in the magnetic field dependency of Faraday rotation angle. More specifically, the present invention relates to a magnetooptical polarization plane switch for changing the polarization directions of light by reversing the direction of a magnetic field applied to the Faraday rotator and to an optical switching device using the polarization plane switch. More specifically, the present invention relates to a polarization plane switch in which the magnetization of the Faraday rotator is locally unsaturated and that of the remaining portion of the rotator is saturated when a magnetic field is applied to the rotator, and a light beam passes through the magnetically saturated portion almost vertically to the film surface and to an optical switching device using the switch.

2. Description of the Prior Art

An optical communication system and an optical measuring instrument require an optical switching device for three-dimensionally changing the traveling directions of light. The optical switching device uses a 1×1-type optical switching device (optical shutter), a 2×2-type optical switching device, or a device fabricated by combining them. A mechanical system, a system using the electrooptical effect or acoustooptical effect, and a magnetooptical system have been proposed as the structure of the optical switching device. Among these system, the magnetooptical system magnetically changes the polarization planes of a light beam by a magnetooptical polarization plane switch set in the system, which has the advantages that it operates at a high speed, it can be downsized, and it has an excellent long-term reliability compared to the mechanical system.

A typical magnetooptical polarization plane switch comprises a yoke made of a magnetic material, a coil provided on the yoke, and a thin-plate Faraday rotator inserted into a gap of the yoke. The Faraday rotator uses a Bi-substituted iron garnet single-crystal film in many cases recently because Bi-substituted iron garnet has a large Faraday rotation factor and therefore it can be formed into a relatively thin structure and moreover the LPE has a high productivity.

The Faraday rotator is inserted into the gap formed on the yoke vertically to the longitudinal direction of the gap. In this case, the Faraday rotator is designed so that part of the rotator protrudes beyond the gap and a light beam passes through the protruding portion. In the case of the prior art, however, the protruding portion of the Faraday rotator is minimized and used by applying a magnetic field in which the magnetization of a garnet single-crystal film is saturated throughout the film surface.

An existing magnetooptical switching device has a switching time of 40 to 250 μsec. As one of the 1×1-type switches (optical shutters), the inventors of the present invention proposed an intense-light cutoff apparatus (Japanese Patent Laid-Open No. 6-34894/1994, published Oct. 10, 1994). The apparatus is used to protect an optical part or electronic part by arranging an optical power detector, a delay fiber, and an optical switching device in an optical path in series, quickly turning off the optical switching device when detecting light of excessive intensity, and cutting off the intense light passing through the delay fiber. The cutoff time requested to the above optical switching device is determined by the delay time of an optical fiber. The cutoff time is approx. 1 μsec for the fiber length of 200 m and approx. 10 μsec for the fiber length of 2,000 m. Because the fiber length directly influences the size of the intense-light cutoff apparatus, it is naturally preferable to decrease the fiber length as small as possible. Practically, it is necessary that an optical switching device be capable of cutting off intense light at a cutoff time of 10 μsec or less and with a high reliability.

Since the above-mentioned optical switching device using a Faraday rotator must change magnetic-field directions, it uses not a permanent magnet material but a semi-hard magnetic material as its magnet. Therefore, a very large magnetic field cannot be applied to the device and an LPE film with a small magnetic field Hs necessary for saturation is required. For example, $(GdBi)_3(FeAlGa)_5O_{12}$ is the material of a typical LPE film with a small magnetic field Hs necessary for saturation. This material has a small saturation magnetization because it has a compensation temperature (Tcomp) close to an operation temperature (room temperature).

For this type of material, it is generally known that coercive force Hc is inversely proportional to the difference between operating temperature T and compensation temperature Tcomp (Hc oC 1/(T-Tcomp)). It is said that the coercive force Hc is generated due to a defect or strain of a film or the fact that $Fe^{2+}$ or $Fe^{4+}$ pins domain walls. For example, there is a report that coercive force Hc decreases to 20 Oe as the result of thermally treating a garnet film $(Bi_{0.8}Tm_{2.14}Pb_{0.06}Fe_{3.1}Ga_{1.9}O_{12})$ with a saturation magnetization of 35 G and a coercive force of 100 Oe at room temperature in an oxygen atmosphere for 53 min at 1,050° C. (M. Pardavi-Horvath et al., "Asymmetric switching in high coercivity garnet films", Journal of Magnetism and Magnetic Materials, 104–107, (1992), pp. 433–435).

SUMMARY OF THE INVENTION

The present invention is based upon the above background and its main object is to provide a magnetooptical polarization plane switch and an optical switching device which perform switching at a high speed.

It is another object of the present invention to provide a Faraday rotator with a small coercive force Hc and a small magnetic field Hs necessary for saturation and hardly causing hysteresis in the magnetic field dependency of a Faraday rotation angle.

The inventors of the present invention studied the relation between switching speed and magnetic field distribution to be applied and have found that the switching speed is improved by applying a magnetic field in which magnetization is three-dimensionally distributed and the magnetization of part of an iron-containing garnet single-crystal film is unsaturated compared to the case of applying a magnetic field in which the magnetization of the whole iron-containing garnet single-crystal film is saturated. The present invention is based upon the findings described above.

The present invention is a polarization plane switch comprising a Faraday rotator made of an iron-containing garnet single-crystal film and magnetic field applying means capable of reversing a magnetic field to be applied to the Faraday rotator. In the present invention the magnetization of part of the Faraday rotator is unsaturated and that of the remaining portion of it is saturated when a magnetic field is applied by the magnetic field applying device and a light beam passes through the portion where magnetization is saturated almost vertically to the film surface.

Specifically, the present invention comprises a C-shaped flat yoke made of a semi-hard magnetic material, a coil provided on the yoke, and a Faraday rotator made of an iron-containing garnet single-crystal film inserted into a gap formed on the yoke vertically to the longitudinal direction of the gap, wherein the Faraday rotator has a size most of which protrudes outside the gap, the front end of the protrudes outside the gap, the front end of the protruding portion is a magnetically unsaturated region, and a light beam passes through a magnetically saturated region in the protruding portion almost vertically to the film surface.

Moreover, it is possible to set a magnetic shielding material to the front end of the protruding portion of the Faraday rotator to form a magnetically unsaturated region. Furthermore, it is possible that a main yoke and an auxiliary yoke are used and magnetic fields generated by the both yokes are applied to a Faraday rotator form the opposite direction to each other. Furthermore, it is possible to use a structure in which a plurality of portions with a small gap length of the gap of a yoke are formed at intervals so that portions with a large gap length of it serve as magnetically unsaturated regions.

As the Faraday rotator, it is preferable to use a Faraday rotator made of Bi-substituted iron garnet single crystal grown by the LPE and having a compensation temperature, and thermally treated under the top condition at a temperature, and thermally treated under the top condition at a temperature between 1,120° and 1,180° C. for 7 hours or less and preferably more than 0.5 hours, inclusive.

In the present invention, it is possible to fabricate an optical switching device with two wedge-shaped birefringent single crystals arranged so as to face each other, a polarization plane switch made by arranging a Faraday rotator between the single crystals like the above, and lens-integrated fibers for input and output. Moreover, it is possible to fabricate an optical switching device with two polarizing beam splitters arranged so as to face each other, a polarization plane switch made by arranging a Faraday rotator between the beam splitters like the above, and a ½-wavelength plate located between the Faraday rotator and either of the splitters.

In the case of the present invention, a Faraday rotator made of an iron-containing garnet single-crystal film is inserted into the gap of a yoke, and magnetization is saturated in the vicinity of the gap but a portion remote from the gap is a magnetically unsaturated region. Under this magnetization state, the switching speed is improved because of the following reasons. That is, in the existing prior art process of magnetization reversal of an iron-containing garnet single-crystal film when the magnetization of the whole film surface is saturated, some of magnetic moments are first reversed, then magnetic domain wall movement occurs because the local portion serves as a nucleus, and finally the magnetization of all magnetic moments is reversed. In the present invention, magnetization of an iron-containing garnet single-crystal film is locally unsaturated and, therefore, a nucleus for magnetization reversal is already present at the first stage of the switching operation. Therefore, because the present invention omits the nucleus forming stage, the magnetization reversal occurs earlier by the time equivalent to the stage and the switching time is shortened.

In the case of the present invention, because a light beam passes through a magnetically-saturated portion near the gap, the isolation and the insertion loss are the same as those of an existing product.

Moreover, by applying a proper thermal treatment to an iron-containing garnet single-crystal film, an area S (Table 1) enclosed by hysteresis related to the magnetic field dependency of a Faraday rotation angle greatly deceases through the Faraday rotation angle, saturation magnetization, and magnetic field necessary for saturation do not change. Furthermore, under the optimum condition, the area S almost comes to zero. The area enclosed by hysteresis has a correlation with the switching time. Therefore, by using the Faraday rotator, the switching operation of an optical switching device is greatly accelerated.

DESCRIPTION OF THE PREFERRED EMBODIMENT

Figure 1:
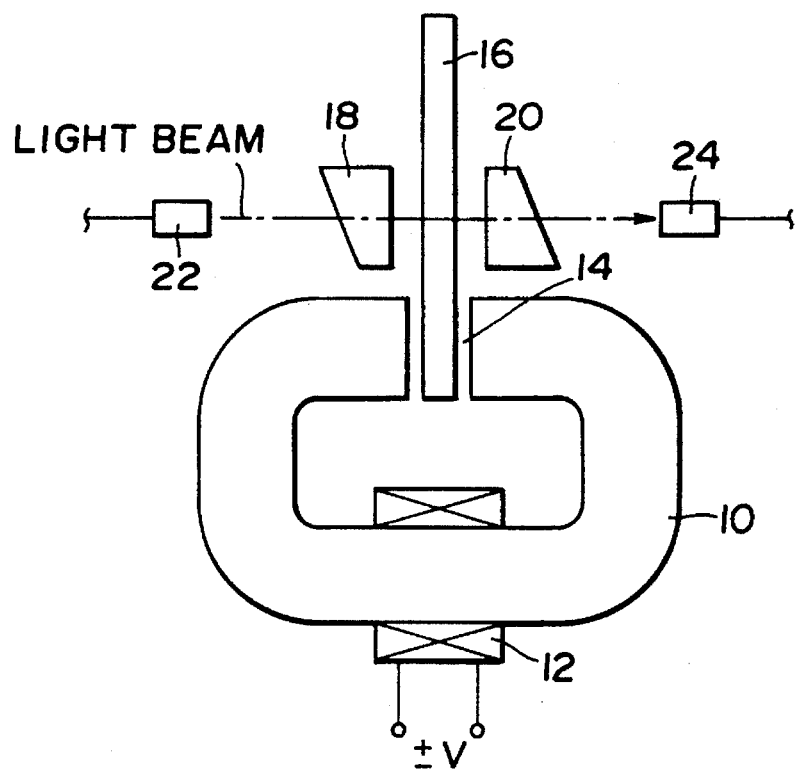
FIG. 1 is a diagram of the optical switching device of the first embodiment of the present invention.
Figure 2:
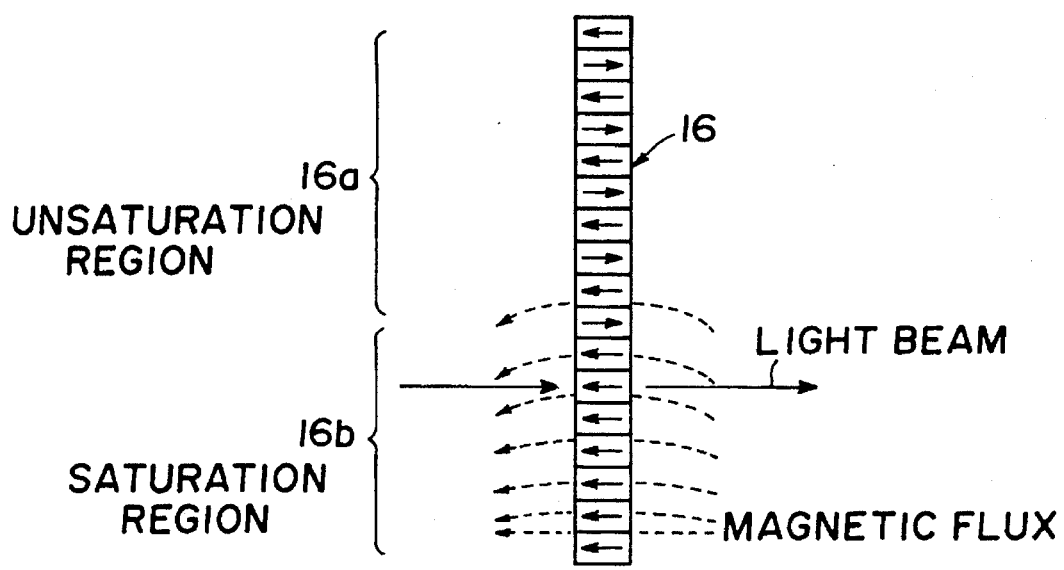
FIG. 2 is a diagram showing saturated and unsaturated domains of the Faraday rotator shown In FIG. 1.

A 1×1-type optical switching device (optical shutter) is shown in FIGS. 1 and 2 showing an embodiment of the optical switching device of the present invention. A polarization plane switch comprises a C-shaped flat yoke 10 made of a semi-hard magnetic material, a coil 12 provided on the yoke, and a Faraday rotator 16 inserted into a gap 14 formed on the yoke 10 vertically to the longitudinal direction of the gap. The Faraday rotator 16 is made of a Bi-substituted iron garnet single-crystal film formed by the LPE and having a compensation temperature. Moreover, the Faraday rotator 16 has such a size that the major part of it protrudes outside the gap 14 and, as shown in FIG. 2, the front end of the protruding portion is a magnetically unsaturated region 16a and a light beam passes through a magnetically saturated region 16b in the protruding portion almost vertically to the film surface. Wedge-shaped birefringent single crystals 18 and 20 are arranged at the both sides of the Faraday rotator 16 and moreover, a lens-integrated optical fiber 22 for input and a lens-integrated optical fiber 24 for input and lens-integrated optical fiber 24 for output are set at the both sides of the Faraday rotator 16.

That is, in this embodiment, the Faraday rotator 16 is set so that the magnetization of the Faraday rotator 16 is not saturated throughout the film by the magnetic field applying device of the yoke 10 and coil 12 by increasing the size of the rotator 16 so that the major part of the rotator 16 protrudes outside the gap 14. In other words, the leakage magnetic field due to the magnetic field applying device is set so that the magnetization of the Faraday rotator 16 is not saturated throughout the film.

The Faraday rotator 16 is obtained by forming a single-crystal film made of $(GdBi)_3(FeAlGa)_5O_{12}$ formed by the LPE into a size of 2×7×0.50 mm and mirror-finishing the plane of 2×7 mm. The single-crystal film is made of $Gd_{2.02}Bi_{0.98}Fe_{4.43}Al_{0.44}Ga_{0.13}O_{12}$ and has a compensation temperature of $-5°$ C.. When magnetization is performed vertically to the film surface, the saturation magnetization at room temperature is 80 G, the magnetic field Hs necessary for saturation is 80 Oe, and the Faraday rotation angle at a wavelength of 1.55 μm is 45°. The birefringent single crystals 18 and 20 serving as a polarizer and an analyzer respectively use a wedge-shaped rutile crystal. The lens-integrated optical fibers 22 and 24 use a single-mode fiber.

Figure 3:
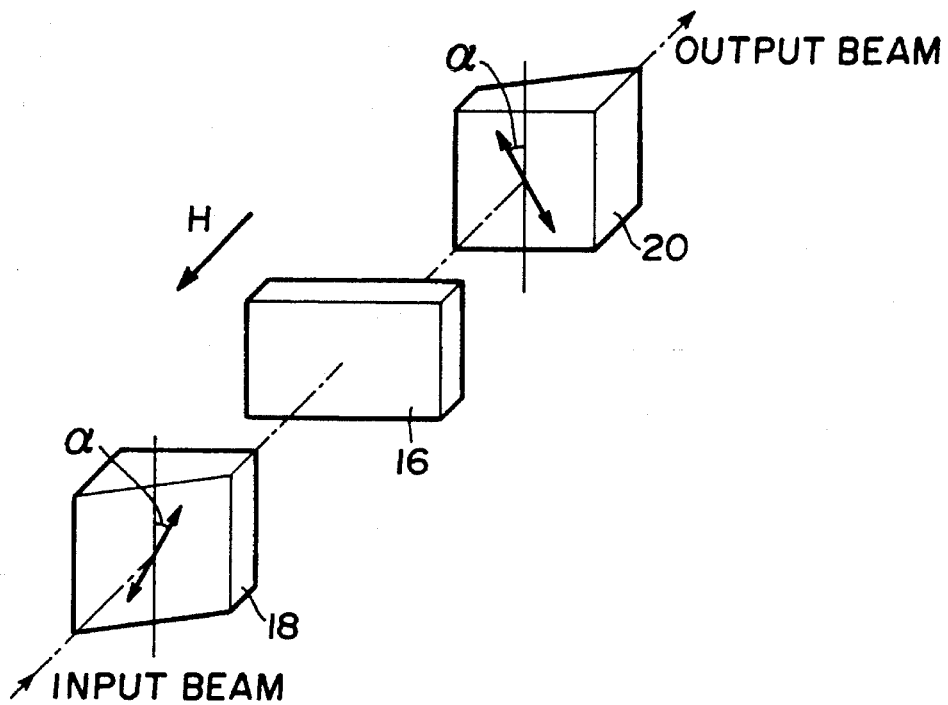
FIG. 3 is an operational diagram of the optical switching device in FIG. 1.

FIG. 3 shows the operation of the optical switching device. When viewing the direction of input light beam, the wedge-shaped birefringent single crystal 18 serving as a polarizer and the wedge-shaped birefringent single crystal 20 serving as an analyzer are different in thickness at the right and left sides and they are combined so that the thick portion of one faces the thin portion of the other. The optical axis of the wedge-shaped birefringent single crystal 18 serving as a polarizer tilts by an angle of α (=22.5°) clockwise to the vertical direction and the optical axis of the wedge-shaped birefringent single crystal 20 tilts by an angle of α (=22.5°) counterclockwise to the vertical direction. The arrow H shows the direction of a magnetization to be applied to the Faraday rotator 16. Under the above state, the input light beam is emitted by passing through the both wedge-shaped birefringent single crystals 18 and 20. When applying a reverse magnetic field to the Faraday rotator 16 by changing the coil driving voltages, the direction of Faraday rotation differs by 90° and the input light beam cannot pass through the wedge-shaped birefringent single crystal 20 serving as an analyzer but it is cut off. In these switching operations, the light beam passes through the magnetically saturated region of the Faraday rotator 16 and the front end remote from the gap 14 of the yoke 10 serves as an unsaturated region. Therefore, because the nucleus for magnetization reversal is always present, it is possible to control the penetration and cutoff of input light beam at a high speed by supplying pulse current to a coil. According to the trial manufacture result, the switching time of an optical switching device with the above structure is 25 μsec, the insertion loss is 0.5 dB, and the isolation is 40 dB.

Figure 4:
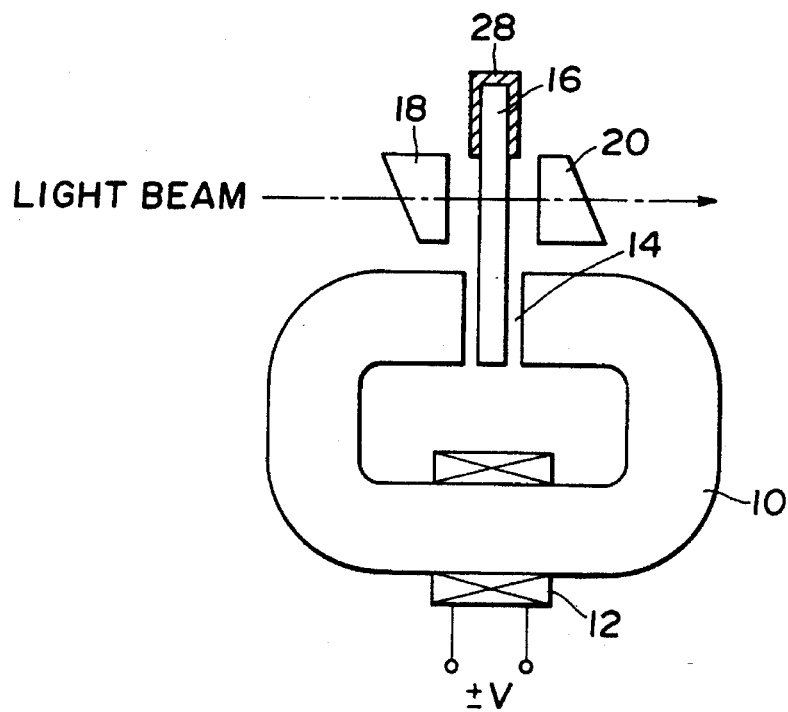
FIG. 4 is a diagram of the optical switching device of the second embodiment of the present invention.

FIG. 4 shows the second embodiment of the optical switching device of the present invention. Because the basic structure can be the same as that in FIG. 1, a portion corresponding to that in FIG. 1 is provided with the same symbol to simplify the description. Also in the case of the second embodiment, the Faraday rotator 16 has such a size that the major part of it protrudes outside the gap 14 and the front end of the protruding portion is covered with a U-shaped magnetic shielding material 28. A magnetic field is applied to the Faraday rotator 16 by the magnetic field applying device comprising the yoke 10 and coil 12. Thus, the portion not covered with the magnetic shielding material 28 serves as a magnetically saturated region but the portion covered with the magnetic shielding material 28 remains unsaturated. This structure has an advantage that dimensions of a Faraday rotator can be decreased compared to those of the structure in FIG. 1 though the number of parts increases.

Figure 5:
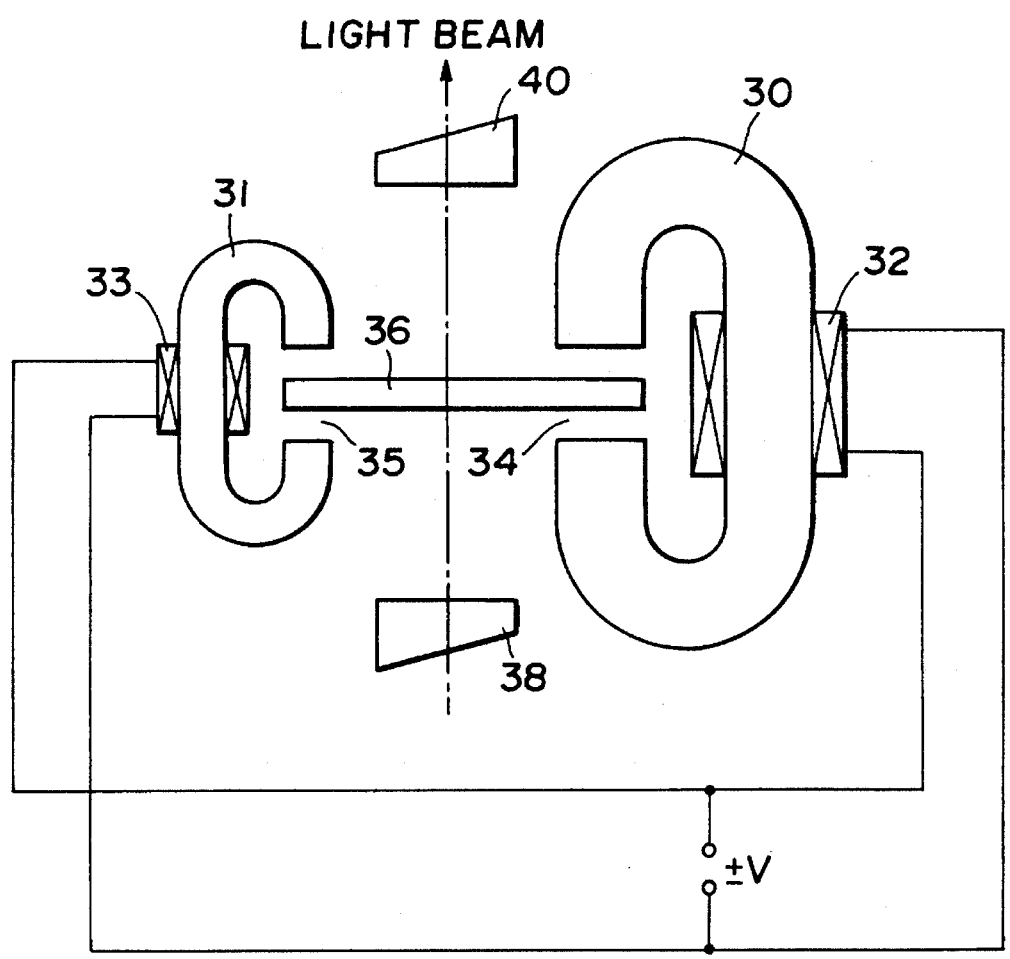
FIG. 5 is a diagram of the optical switching device of the third embodiment of the present invention.
Figure 6:
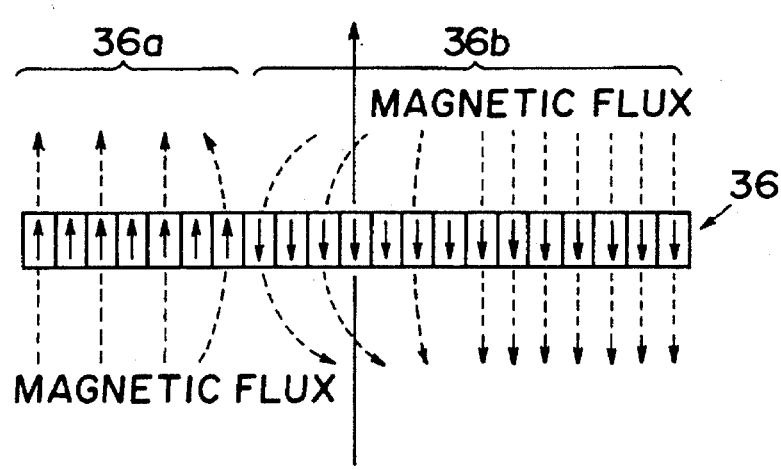
FIG. 6 is a diagram showing saturated and unsaturated regions of the Faraday rotator shown in FIG. 5.

FIG. 5 shows the optical switching device of the third embodiment of the present invention. The optical switching device has a C-shaped flat main yoke 30 made of a semi-hard magnetic material, a coil 32 provided on the main yoke 30, and moreover a C-shaped flat auxiliary yoke 31 made of a semi-hard magnetic material, and a coil 33 provided on the auxiliary yoke 31, in which they are arranged so that a gap 34 formed on the main yoke 30 is forced with and flush with a gap 35 formed on the auxiliary yoke 35. Moreover, the optical switching device is constituted by inserting a Faraday rotator 36 made of an iron-containing garnet single-crystal film Into the gaps 34 and 35 in common vertically to the longitudinal direction of the gaps. DC pulse current is supplied so that a magnetic field generated by the auxiliary yoke 31 are applied in the opposite direction to the Faraday rotator 36 and the magnetic field generated by the main yoke 30 is larger than that generated by the auxiliary yoke 31. Therefore, as shown in FIG. 6, most portions 36b of the Faraday rotator 36 are magnetized downward by the main yoke 30. A light beam passes through the portions 36b where magnetization is saturated by the main yoke almost vertically to the film surface. Wedge-shaped birefringent single crystal 38 and 40 are arranged at the both sides of the Faraday rotator 36.

Though it is possible to change the magnetic fields generated by the both magnetic field applying device at the same timing, they are not frequently changed for this type of optical switching device. Therefore, it is preferable to first perform the switching of the optical switching device by supplying pulse current to the main yoke 30 when necessary and thereafter locally perform magnetization in the opposite direction by supplying pulse current to the auxiliary yoke 31 at a proper delayed timing to prepare for the next switching. Because a nucleus for reverse magnetization is produced by the auxiliary yoke 31 for the magnetization switching by the main yoke 30, the switching speed is greatly increased similarly to the case of the above each embodiment.

Figure 7:
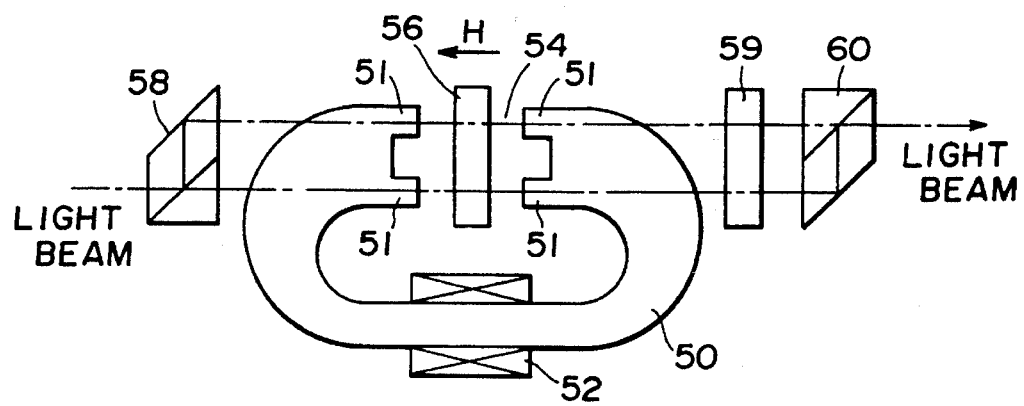
FIG. 7 is a diagram of the optical switching device of the fourth embodiment of the present invention.
Figure 8:
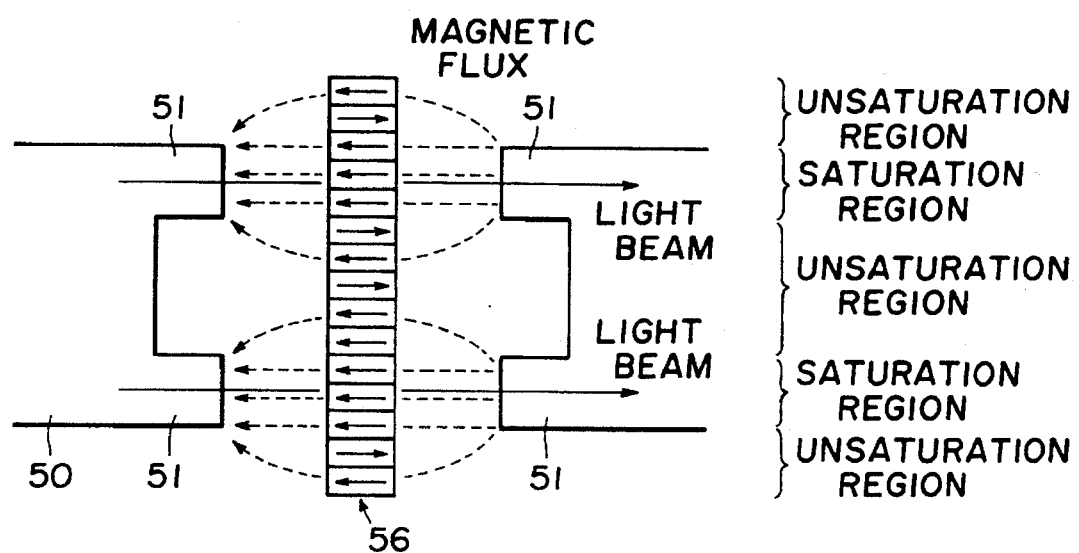
FIG. 8 is a diagram showing saturated and unsaturated regions of the Faraday rotator shown in FIG. 7.

FIG. 7 shows the optical switching device of the fourth embodiment of the present invention. The optical switching device has a C-shaped flat yoke 50 made of a semi-hard magnetic material, a coil 52 provided on the yoke 50, and a Faraday rotator 56 made of an iron-containing garnet single-crystal film inserted into a gap 54 formed on the yoke 50 vertically to the longitudinal direction of the gap 54. The gap of the yoke 50 has a structure in which two protrusions 51 are formed so as to face each other at the both sides of the faced ends respectively and two portions with a short gap length are formed at intervals. As shown in FIG. 8, because magnetic fields are concentrated on the protrusions 51, portions with the short gap length serve as magnetically saturated regions. However, it is possible to make other portions serve as unsaturated regions. A light beam passes through the two magnetically saturated portion almost vertically to the film surface.

A polarizing beam splitter 58 is set to one side of the Faraday rotator 56 and a ½-wavelength plate 59 and a polarizing beam splitter 60 are set to the other side of it. The polarizing beam splitters 58 and 60 have a structure in which a polarizing separator film is held by a parallelogram prism and a right-triangle prism and a total reflection film is formed on a plane parallel with the polarizing separator film. While the optical switching device is turned on, input light beam is separated into P-polarized light and S-polarized light by the polarizing separator film, the plane of polarization is rotated by 45° by the Faraday rotator 56, and the P- and S-polarized light beams are converted into S- and P-polarized light beams, respectively, by the ½-wavelength plate 59 and then combined by the polarizing beams splitter 60 to serve as output light beam. While the optical switching device is turned off, the plane of polarization is rotated in the opposite direction by 45° by the Faraday rotator 56. Therefore, the direction of the output light beam from the polarizing beam splitter 60 is different from the direction of the output light beam by 90° and therefore it is not emitted to a normal output port. The optical switching device operates as a 1×1-type optical switching device.

As the Faraday rotator used for the optical switching device, it is preferable to use a Faraday rotator made of Bi-substituted iron garnet single crystal grown by the LPE and having a compensation temperature, and thermally treated under the top condition at a temperature between 1,120° and 1,180° C. for 7 hours or less and, preferably, more than 0.5 hours, inclusive. A typical single-crystal film is made of $(GdBi)_3(FeAlGa)_5O_{12}$, which is formed into a size of 2×7×0.36 mm. The plane of 2×7 mm is mirror-finished and the substrate is scraped off. The above single crystal is made of, for example, the above $Gd_{2.02}Bi_{0.98}Fe_{4.43}Al_{0.44}Ga_{0.13}O_{12}$ which has a compensation temperature of −5° C.

Figure 9:
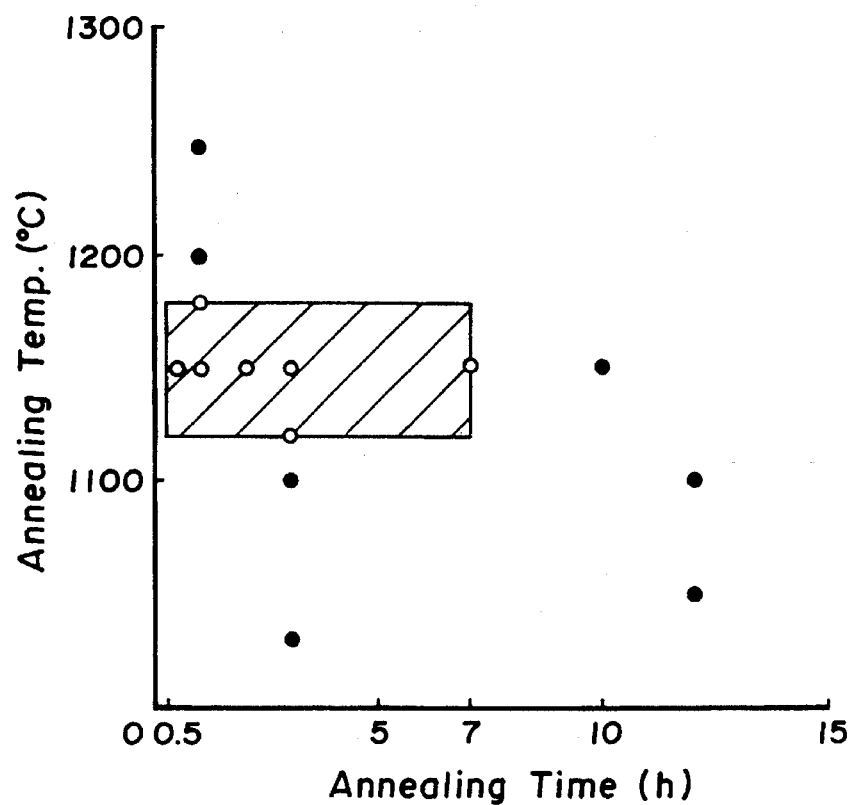
FIG. 9 is a graph showing thermal treatment conditions of a Faraday rotator.

The above thermal treatment conditions are obtained from various experiments. FIG. 9 shows the thermal treatment conditions used for the experiments. Thermal treatment was performed in the atmospheric environment by placing the device on the platinum plate in an electric furnace. The temperature raising rate and the temperature lowering rate were 120° C./hr respectively and the maximum temperature (top temperature) and the holding time were variously changed.

Figure 10:
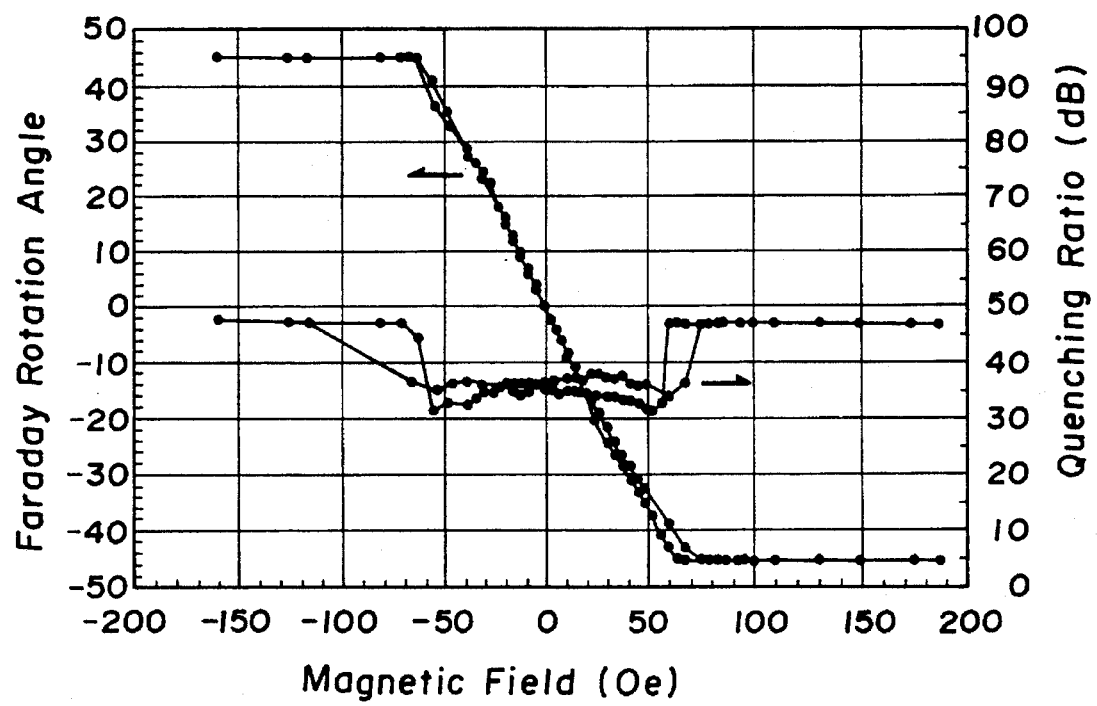
FIG. 10 is a graph showing the magnetic field dependency of Faraday rotation angle and quenching ratio of a Faraday rotator thermally treated under the optimum conditions.

To evaluate the crystal, Faraday rotation was measured by using the light with a wavelength of 1.31 μm and changing magnetic fields by an electromagnet. Saturation magnetization was measured by VSM (Vibration Sample Magnet Meter). Table 2 shows the measurement results. FIG. 10 shows the measurement results of the magnetic field dependency of the Faraday rotation of the device (present invention) thermally treated at 1,150° C. for 3 hr. An area S enclosed by hysteresis of 0.1 kdeg/Oe and a quenching ratio of 30 dB or more are obtained.

In FIG. 9, the shaded region (including the boundary) is the range of the top condition of preferable thermal treatment (sample Nos. 6 to 11 and 13 in Table 1). When considering the application to an optical switching device, it is necessary to meet the conditions that the magnetic field Hs necessary for saturation is 100 Oe or less, Faraday rotation angle is 45°, coercive force Hc is 5 Oe or less, and area S enclosed by hysteresis related to the magnetic field dependency of the Faraday rotation angle is 1 kdeg/Oe as the characteristics required for a Faraday rotator. The Faraday rotator of the present invention meets the above conditions. Thermal treatment is performed in accordance with the process of a temperature raising step, a top condition keeping step and then a temperature lowering step in a furnace. Therefore, when the top condition also includes a case in which the holding time is zero (that is, the treatment in which temperature is raised and reaches a predetermined value and then it is immediately lowered). When the thermal treatment temperature is lower than 1,120° C. (sample Nos. 1 to 5 in Table 1), the coercive force Hc increases and the area S enclosed by hysteresis does not decrease. When the temperature exceeds 1,180° C. (sample Nos. 14 and 15), it is necessary to increase the film thickness because the Faraday rotation angle decreases and moreover the surface becomes rough. This is probably because bismuth Bi disperses out of crystal and the composition is also deviated. When the thermal treatment time exceeds 7 hours (sample No. 12), the magnetic field Hs necessary for magnetic saturation increases. This is probably because the vertical magnetism anisotropy lowers and the film approaches an in-plane magnetized film. As the result of performing these various experiments, it is found that thermal treatment at 1,150° C. for 7 hr is optimized. When performing no thermal treatment (samples 16 and 17), a large characteristic fluctuation was observed between devices. However, as the result of applying thermal treatment to devices under the above conditions, characteristic fluctuation was hardly observed.

Figure 11:
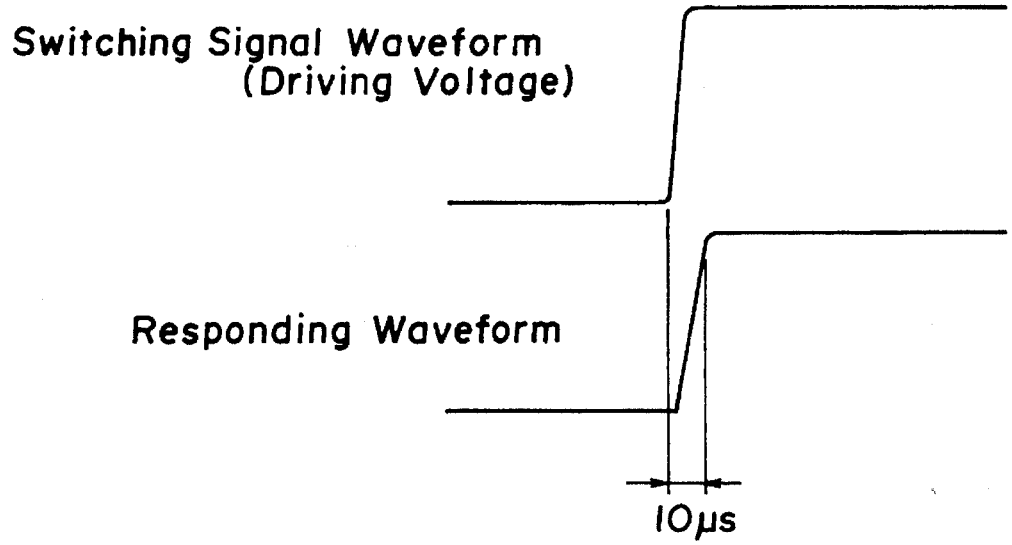
FIG. 11 is an operation waveform diagram of the optical switching device of the present invention.
Figure 12:
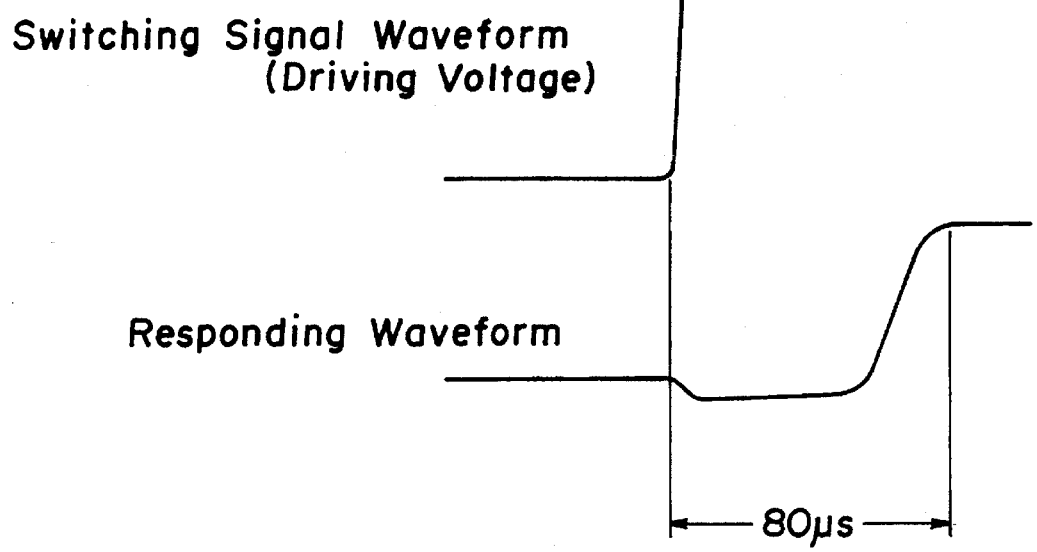
FIG. 12 is an operating waveform diagram of an existing optical switching device using a Faraday rotator.

FIGS. 11 and 12 show switching waveforms of the device of the present invention and an existing (prior art) device subjected to no thermal treatment. These waveforms are obtained by tracing waveform photos with an oscilloscope. In the switching device of the present invention, the delay time of a response waveform to a switching signal (driving voltage) is approx. 10 μsec. (A delay time of 6 μsec. was obtained by combination of a thermally treated film and an unsaturated portion.) In an existing switching device using a Faraday rotator subjected to no thermal treatment, however, a large delay time of approx 80 μsec is necessary until switching is completed after a switching signal is outputted.

FIGS. 13 through 16 are perspectives of the optical switching devices.

Figure 13:
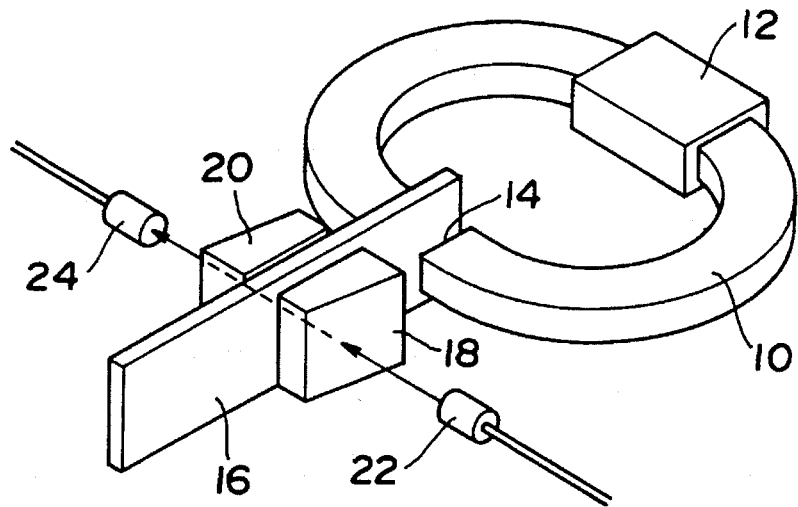
FIG. 13 is a perspective view of the optical switching device shown in FIG. 1.

In FIG. 13 which shows a more specific structure of the optical switching device shown in FIG. 1, the Faraday rotator 16 is extended transversely to the direction opposite to the coil 12 relative to the gap 14. Each of the elements has been described with reference to FIG. 1 and no further detailed description will be necessary.

Figure 14:
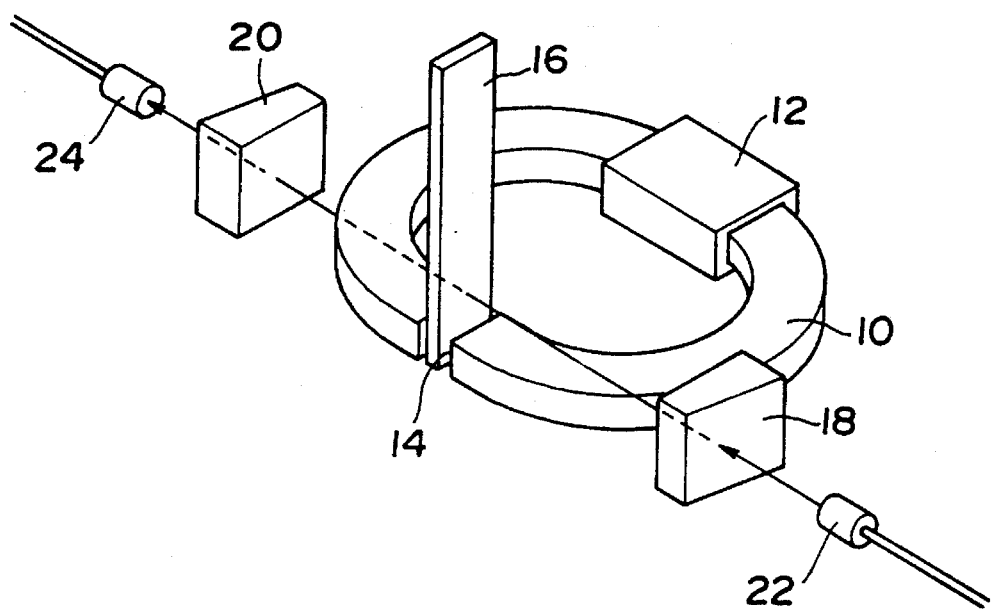
FIG. 14 is a perspective view of a modification of the optical switching device shown in FIG. 13.

FIG. 14 shows a modification of the structure shown in FIG. 13, in which the Faraday rotator 16 is extended vertically relative to a flat side of the yoke 10. In this modified structure, the wedge-shaped birefringent single crystals 18, 20 are positioned relatively distal to the Faraday rotator 16.

Figure 15:
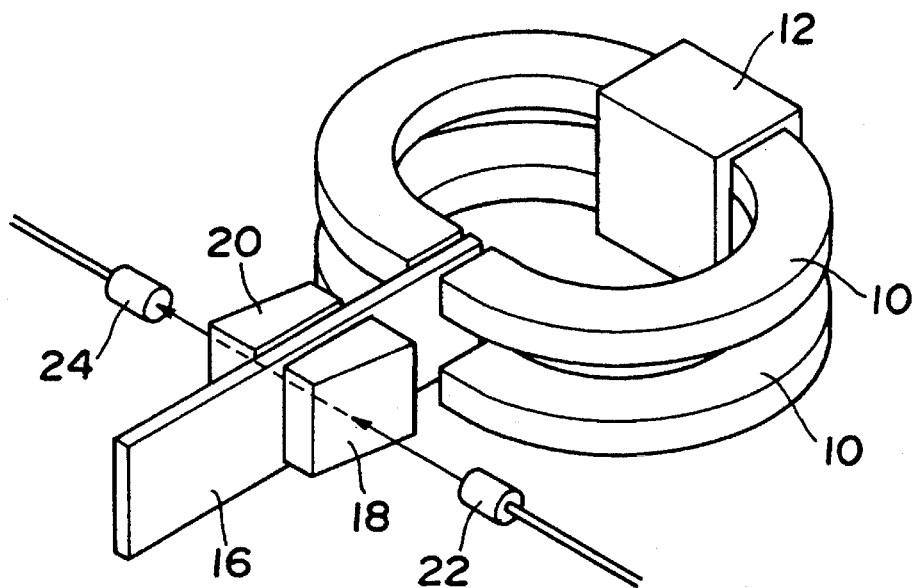
FIG. 15 is a perspective view of another modification of the optical switching device shown in FIG. 13.
Figure 16:
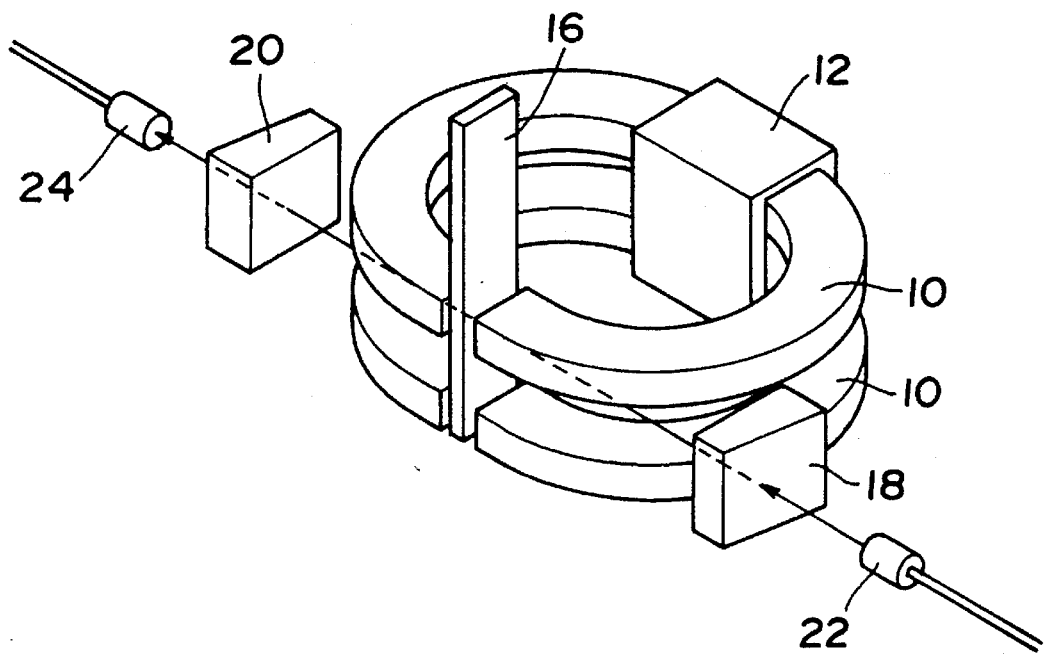
FIG. 16 is a perspective view of a modification of the optical switching device shown in FIG. 14.

FIG. 15 shows a modified structure of the optical suitaching device shown in FIG. 14. in which two yokes 10 are provided. FIG. 16 is a modification of the structure of FIG. 14, in which two yokes 10 are provided and a light beam is transmitted through the space confined between the two yokes. An operational mode is similar as those of the previous-described embodiments, and a further description will not be necessary.

The polarization plane switch of the present invention can be used for not only the above 1×1-type optical switching device but also the 2×2-type optical switching device and other magnetooptical devices.

As described above, the present invention makes it possible to perform switching at a high speed because the magnetization of a Faraday rotator is not saturated throughout the film surface and an unsaturate region (or region in which magnetization direction is reversed even if the film surface is saturated) is locally present, and thereby a nucleus for magnetization reversal is always present. Particularly for a device thermally treated under preferred conditions, hysteresis related to the magnetic field dependency of a Faraday rotation angle greatly decreases. Moreover, since the great decrease of hysteresis interacts with the presence of the unsaturated region, the switching speed is greatly improved into 10 μsec or less. Thus, an intense-light cutoff apparatus can be downsized and a system with a high reliability can be constituted.

TABLE 1

| Sample number | Thermal treatment conditions Temperature (°C.) | Time (h) | Magnetic field necessary for saturation (Oe) | Faraday rotation angle (Degree) | Coercive force (Oe) | Area S enclosed by hysteresis (Kdeg/Oe) | Switching delay time (μsec) | Decision |
|---|---|---|---|---|---|---|---|---|
| 1 | 420 | 12 | 150 | 45 | 130 | 15.0 | 40 | X |
| 2 | 1030 | 3 | 400 | 45 | 340 | 61.2 | 120 | X |
| 3 | 1050 | 12 | 100 | 45 | 70 | 12.6 | 30 | X |
| 4 | 1100 | 3 | 100 | 45 | 45 | 8.1 | 60 | X |
| 5 | 1100 | 12 | 350 | 45 | 300 | 54.0 | 100 | X |
| 6 | 1120 | 3 | 80 | 45 | 2 | 0.4 | 10 | O |
| 7 | 1150 | 0.5 | 85 | 45 | 3 | 0.5 | 10 | O |
| 8 | 1150 | 1 | 80 | 45 | 3 | 0.3 | 10 | O |
| 9 | 1150 | 2 | 80 | 45 | 2 | 0.3 | 10 | O |
| 10 | 1150 | 3 | 80 | 45 | 0 | 0.2 | 10 | O |
| 11 | 1150 | 7 | 80 | 45 | 0 | 0.1 | 10 | O |
| 12 | 1150 | 10 | 120 | 45 | 0 | 0.1 | 25 | X |
| 13 | 1180 | 1 | 80 | 45 | 0 | 0.1 | 10 | O |
| 14 | 1200 | 1 | 100 | 42 | 0 | 0.1 | — | X |
| 15 | 1250 | 1 | 200 | 36 | 0 | 0.0 | — | X |
| 16 | With no thermal treatment | | 120 | 45 | 50 | 9.0 | 80 | X |
| 17 | | | 85 | 45 | 2 | 1.9 | 60 | X |

What is claimed is:

1. A polarization plane switch comprising a yoke made of a magnetic material, a coil provided on the yoke, and a flat Faraday rotator inserted into a gap formed on the yoke vertically to the longitudinal direction of the gap, wherein the Faraday rotator is made of a Bi-substituted iron garnet single-crystal film formed by liquid-phase epitaxy and having a compensation temperature, and thermally treated under the top condition at a temperature between 1,120° and 1,180° C. for 0.5 to 7 hours.

2. The polarization plane switch according to claim 1, wherein the Faraday rotator has such a size that it protrudes outside the gap and a light beam passes through the protruding portion almost vertically to the plane of the single-crystal film.

3. The polarization plane switch according to claim 2, wherein the protruding portion is provided with a magnetic shielding material to form a magnetically unsaturated region and a light beam passes through a magnetically saturated region of the protruding portion almost vertically to the film surface.

4. A polarization plane switch comprising:
   a yoke made of magnetic material;
   a coil provided on the yoke;
   a flat Faraday rotator inserted into a gap formed on the yoke vertically to the longitudinal direction of the gap said Faraday rotator being made of an iron-containing garnet single-crystal film; and
   magnetic field applying means capable of reversing magnetic field to be applied to the Faraday rotator,
   wherein said Faraday rotator has a protruding portion protruding outside said gap, and said Faraday rotator has a magnetically unsaturated portion and a magnetically saturated portion when the magnetic field is applied to the Faraday rotator, so that a light beam passes through the projecting portion almost vertically to the plane of said single-crystal film.

5. A polarization plane switch comprising a main yoke and an auxiliary yoke which are made of a magnetic material, a coil provided on the both yokes respectively, and an iron-containing garnet single crystal inserted into gaps formed on the both yokes in common vertically to the longitudinal direction of the gaps, wherein a magnetic field generated by the main yoke and a magnetic field generated by the auxiliary yoke are applied to the Faraday rotator from the opposite direction to each other and a light beam passes through the magnetically saturated region formed by the main yoke of the Faraday rotator almost vertically to the film surface.

6. A polarization plane switch comprising a yoke made of a magnetic material, a coil provided on the yoke, and a Faraday rotator made of an iron-containing garnet single-crystal film inserted into a gap formed on the yoke vertically to the longitudinal direction of the gap, wherein a plurality of portions with a small gap length are formed on the gap of the yoke portions of the Faraday rotator corresponding to the portions with the small gap length serve as magnetically saturated regions and other portions of the Faraday rotator serve as magnetically unsaturated regions, and a light beam passes through the magnetically saturated regions almost vertically to the film surface.

7. An optical switching device comprising:
   two wedge-shaped birefringent single-crystal devices arranged so as to face each other;
   a Faraday rotator arranged between the two single-crystal devices;

magnetic field applying means for reversing a magnetic field applied to the Faraday rotator;

optical fiber means for input; and optical fiber means for output; wherein the Faraday rotator is made of a Bi-substituted iron garnet single-crystal film formed by liquid-phase epitaxy and having a compensation temperature, and thermally treated under the top condition at a temperature between 1,120° and 1,180° C. for 0.5 to 7 hours.

8. A polarization plane switch comprising:

a Faraday rotator made of Bi-substituted iron garnet single-crystal film formed by liquid-phase epitaxy and having a compensation temperature, and thermally treated under the top condition at a temperature between 1,120° and 1,180° for 0.5 to 7 hours; and magnetic field applying means for applying a magnetic field to the Faraday rotator; wherein the single crystal is made of $(GdBi)_3(FeAlGa)_5O_{12}$.

* * * * *